United States Patent [19]
Smith et al.

[11] Patent Number: 6,126,155
[45] Date of Patent: Oct. 3, 2000

[54] BREAKING AND UPPER SPRING SEAT ASSEMBLY FOR A SPRING AND STRUT MODULE OF AN AUTOMOTIVE VEHICLE

[75] Inventors: Mark C. Smith, Troy; Slawomir J. Herman, Rochester, both of Mich.

[73] Assignee: Chrysler Corporation, Auburn Hills, Mich.

[21] Appl. No.: 09/188,041
[22] Filed: Nov. 6, 1998
[51] Int. Cl.⁷ .................................................. B60G 13/00
[52] U.S. Cl. .............................. 267/220; 267/33; 267/293
[58] Field of Search ..................................... 267/220, 195, 267/140, 152, 153, 219, 258, 293, 294, 33; 188/321.11

[56] References Cited

U.S. PATENT DOCUMENTS

| 4,618,127 | 10/1986 | Le Salver et al. | 267/8 R |
|---|---|---|---|
| 4,805,886 | 2/1989 | Hassan | 267/220 |
| 5,000,429 | 3/1991 | Wittmar et al. | 267/220 |
| 5,078,370 | 1/1992 | McClellan | 267/220 |
| 5,232,209 | 8/1993 | de Fontenay | 267/220 |
| 5,308,048 | 5/1994 | Weaver et al. | 267/220 |
| 5,342,029 | 8/1994 | Carter | 267/220 |
| 5,362,035 | 11/1994 | Carter | 267/220 |
| 5,467,971 | 11/1995 | Hurtubise et al. | 267/220 |
| 5,487,535 | 1/1996 | Carter et al. | 267/220 |
| 5,678,808 | 10/1997 | Claude et al. | 267/64.15 |

*Primary Examiner*—Robert J. Oberleitner
*Assistant Examiner*—Pamela J. Lipka
*Attorney, Agent, or Firm*—Lawrence J. Shurupoff

[57] ABSTRACT

A spring and strut module for an automotive vehicle includes an extensible and contractable strut adapted to be secured to a rigid frame of the vehicle by a strut mount, and a spring unit including a spring for resisting retraction of the strut. A bearing and upper spring seat assembly includes an upper spring seat for the spring and an annular bearing for the spring seat. A bearing base is formed integrally with the spring seat and supports the lower race. A bearing cap covers the upper race. The bearing cap provides a seat for the strut mount. The spring seat is made of a plastic, preferably glass fiber reinforced Nylon. The bearing base has drain holes for carrying away any possible foreign matter. The spring seat has an annular upwardly opening trough, and the strut has an annular downturned lip extending into the trough providing a labyrinth seal inhibiting the entry of foreign matter into the bearing. The bearing base and bearing cap have overlapping portions also for the purpose of inhibiting entry of foreign matter into the bearing.

8 Claims, 3 Drawing Sheets

BREAKING AND UPPER SPRING SEAT ASSEMBLY FOR A SPRING AND STRUT MODULE OF AN AUTOMOTIVE VEHICLE

This invention relates generally to spring and strut modules for automotive vehicles, and more particularly to a bearing and upper spring seat assembly therefor.

BACKGROUND AND SUMMARY OF THE INVENTION

A spring and strut module typically includes a strut and a spring unit between the brake and knuckle module of the wheel assembly and the frame of the vehicle. The strut incorporates a shock absorber which has a piston reciprocable in a cylinder. The piston has a rod secured to a strut mount which is bolted to the frame of the vehicle. The spring unit includes a spring which resists retraction of the piston. The spring is compressed between a lower spring seat secured to the cylinder of the shock absorber and an upper spring seat. A bearing is positioned between the upper spring seat and the strut mount. This invention is directed to the upper spring seat and bearing assembly.

According to prior technology, the upper spring seat was a stamped steel part over-molded with rubber, with a glued in bearing. A sealing system to keep dirt away from the bearing included a labyrinth seal between the upper spring seat and the strut mount. If there was slight misalignment between the strut mount and upper spring seat, the strut mount would rub on the rubber overcoating the upper spring seat, causing a squeaking noise, which was highly objectionable to the operator of the vehicle. The rubber would not wear away readily, so that the squeaking persisted. Also, the misaligned parts would open the labyrinth, allowing dirt to enter the bearing, resulting in premature bearing failure.

Both of these concerns, namely, noise and early bearing failure, can be attributed, at least in part, to the labyrinth system. Therefore a need exists to improve the dimensionals of the system and utilize a labyrinth in which, even when rubbing occurs, no discernable noise results or at least does not persist. In accordance with this invention, the upper spring seat is made of a plastic material, preferably a glass fiber reinforced Nylon. Therefore, if rubbing occurs, the plastic of the upper seat will simply wear away perhaps causing noise for a short time but due to the wear the noise will disappear.

Further improvement in the system involves a reduction in the number of parts required in the bearing. The races of the bearing are held between a bearing cap and a bearing base. In accordance with the invention, the bearing base, rather than being a separate part, is made as an integral part of the upper spring seat. By incorporating the bearing base into the upper spring seat, the number of parts is reduced and the accuracy of the assembly is improved so that misalignment is reduced if not eliminated altogether, and rubbing of the upper spring seat on the strut mount does not occur. The bearing base and bearing cap are designed to provide a further labyrinth protecting the bearing from the intrusion of foreign matter.

One object of this invention is to provide a bearing and upper spring seat assembly for a spring and strut mount of an automotive vehicle having the foregoing features and capabilities.

Another object of the invention is to provide a bearing and upper spring seat assembly which is composed of a relatively few simple parts, is rugged and durable in use, and is capable of being easily and inexpensively manufactured and assembled.

These and other objects, features and advantages of the invention will become more apparent as the following description proceeds, especially when considered with the accompanying drawings.

DETAILED DESCRIPTION OF THE PREFERRED EMBODIMENT

Figure 1:
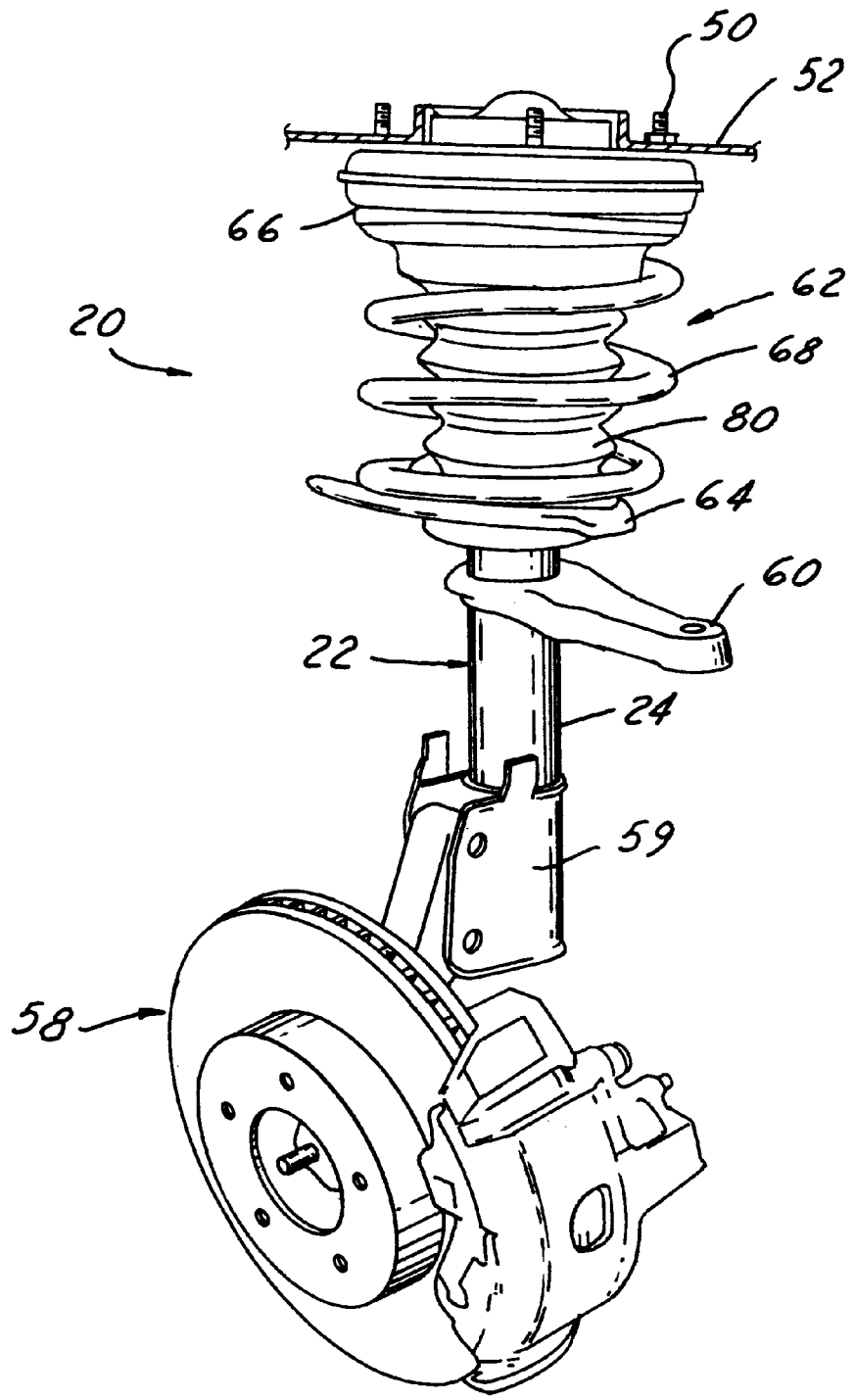
FIG. 1 is a perspective view of a spring and strut module and also shows a brake and knuckle module connected thereto.
Figure 2:
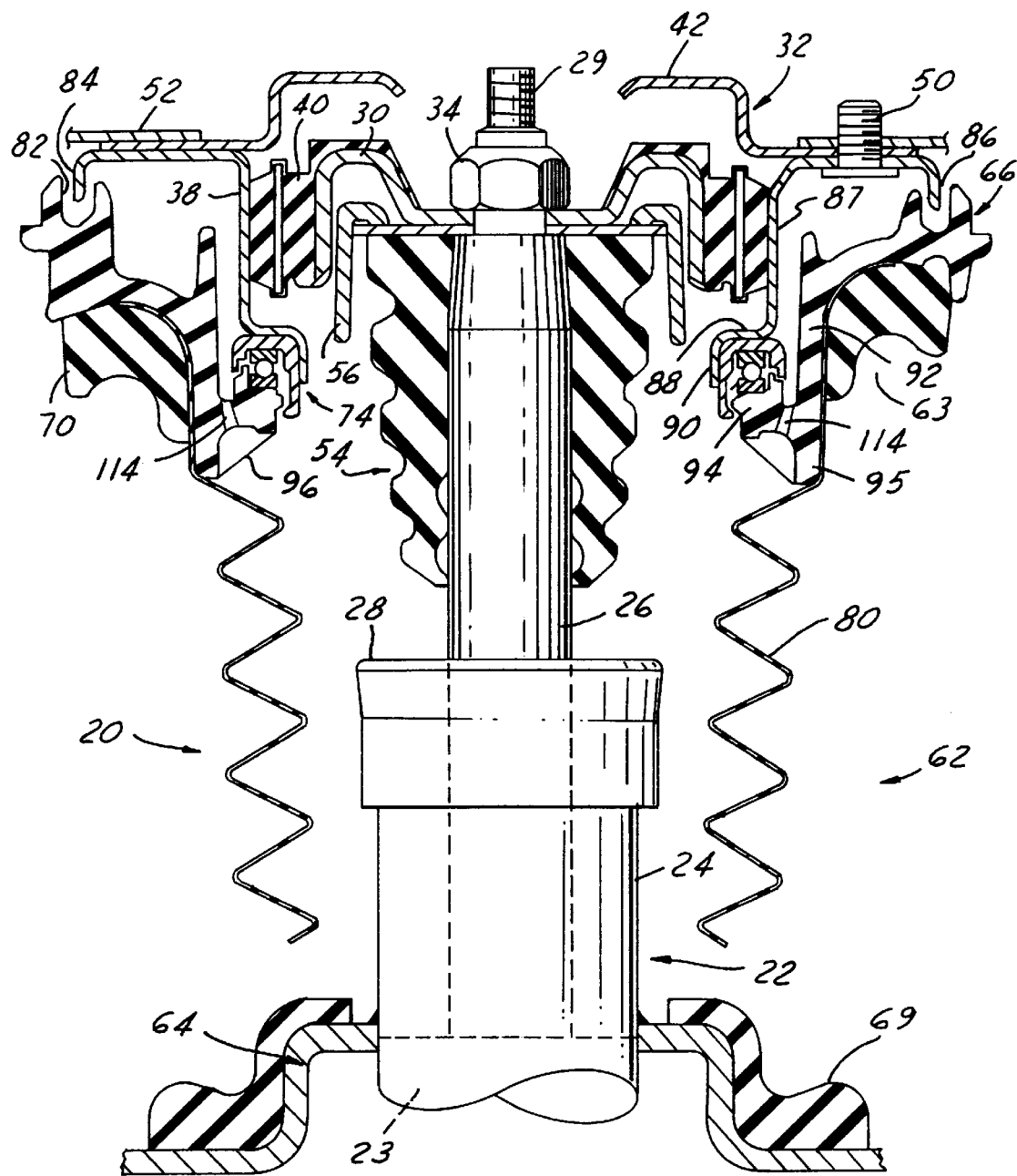
FIG. 2 is a enlarged fragmentary sectional view of the upper portion of the spring and strut module, showing the bearing and upper spring seat assembly of this invention.

Referring now more particularly to the drawings, and especially FIGS. 1 and 2, there is shown a spring and strut module 20 including a strut in the form of a shock absorber 22 having a piston 23 reciprocable in a cylinder 24. The piston has a rod 26 which extends through an opening in a cap 28 closing the upper end of the cylinder. The rod 26 has a reduced end portion forming a bolt 29 which extends through a hole in a center plate 30 of a strut mount 32 and is secured to the center plate by a nut 34 threaded on the bolt 29. The center plate 30 is secured to an outer ring plate 38 of the strut mount 32 by a resilient ring 40. The outer ring plate 38 is secured to an annular cover plate 42 of the strut mount. The cover plate 42 has a circular series of bolts 50 for securing the strut mount 32 to a fixed rigid frame member 52 of vehicle support structure. The frame member 52 has a series of bolt holes to receive the bolts 50.

An elongated tubular jounce bumper 54 of rubber or like resilient, flexible compressible material is sleeved on the rod 26 between the center plate 30 of the strut mount 32 and the cap 28 of the cylinder 24. The lower end of the jounce bumper is engaged by the cap 28 on the upper end of the cylinder 24 when the piston 23 of the shock absorber strokes and the rod 26 moves into the cylinder, to axially compress the jounce bumper and impart a cushioning action. The bumper gradually increases resistance to the retraction of piston 23 as the bumper is compressed. A cup 56 surrounds the jounce bumper to limit outward expansion thereof when compressed. The base of the cup is clamped between the upper end of the piston rod and the center plate 30 of the strut mount.

A brake and knuckle module 58 is secured to the lower end of the cylinder 24 of the shock absorber 22 by a bracket 59. A steering arm 60 has one end secured to the cylinder 24.

The spring and strut module 20 includes a spring unit 62 for resisting retraction of the piston rod 26 into the cylinder 24. The spring unit includes a coil spring 63 encircling the shock absorber. The coil spring 63 is compressed between an annular lower spring seat 64 and an annular upper spring seat 66. The lower end of the coil spring is seated on an isolator 69 carried by the lower spring seat 64 and its upper end is seated on an isolator 70 carried by the upper spring seat 66. The lower spring seat is secured to the cylinder 24 intermediate it ends, as by welding.

An annular ball bearing unit 74 rotatably supports the outer ring plate 38 of the strut mount 32 on the upper spring seat 66. A tubular dust shield 80 surrounds the shock absorber 22 with its ends gripped between the upper and lower spring seats and the associated isolators.

Figure 3:
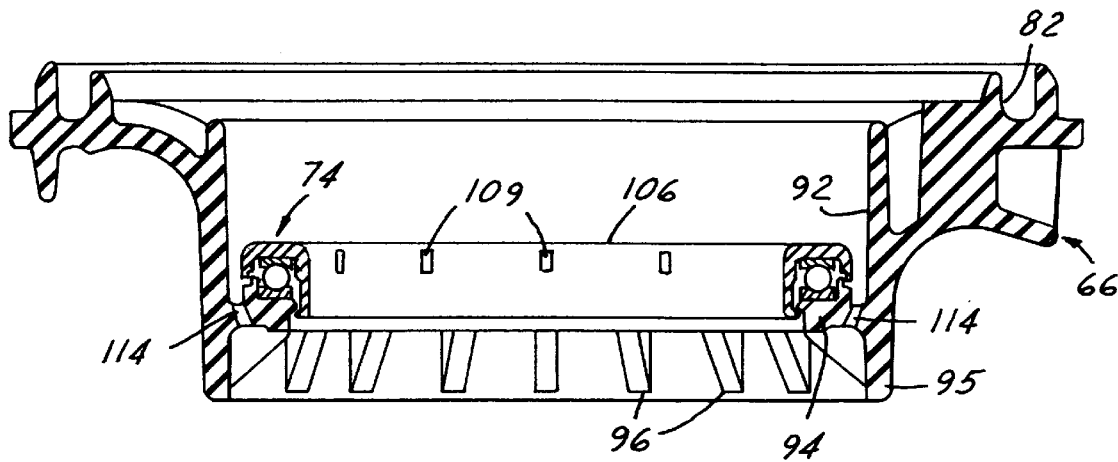
FIG. 3 is an enlarged section view of the upper spring seat and bearing assembly.

Referring to FIGS. 2 and 3, the upper spring seat 66 has an annular upwardly opening generally U-shaped trough 82 around its outer periphery. The outer ring plate 38 of the strut mount has a radially outer, annular, downturned lip 84 extending into the trough, but out of contact therewith, to provide a labyrinth seal 86 to inhibit the entry of foreign matter, including dust, water, and the like from entering into the space between the outer ring plate 38 and the spring seat 66 and damaging the bearing unit 74.

The outer ring plate 38 has an integral, annular, vertical portion 87 which has a horizontal, radially inwardly extending flange 88 at its lower end. The radially inner edge of the flange 88 is bent down to provide an annular, vertically downwardly extending terminal portion 90. The spring seat 66 has an annular ring portion 92 surrounding the parts 87, 88 and 90 of the ring plate 38 of the strut in generally concentric relation therewith. The ring portion 92 forms a vertical wall between the ends of which is an annular, horizontal radially inwardly extending ledge forming a bearing base 94. The bearing base 94 is integral with the ring portion 92 of the spring seat 66. An integral annular skirt extension 95 of the ring portion 92 extends below the level of the bearing base 94. The wall of the ring portion 92 together with bearing base 94 cooperates with the flange 88 and terminal portion 90 to form an annular space of generally rectangular cross section for housing the annular ball bearing unit 74. The bearing base 94 is reinforced by circumferentially spaced ribs 96 extending between the base 94 and the skirt extension 95.

Figure 4:
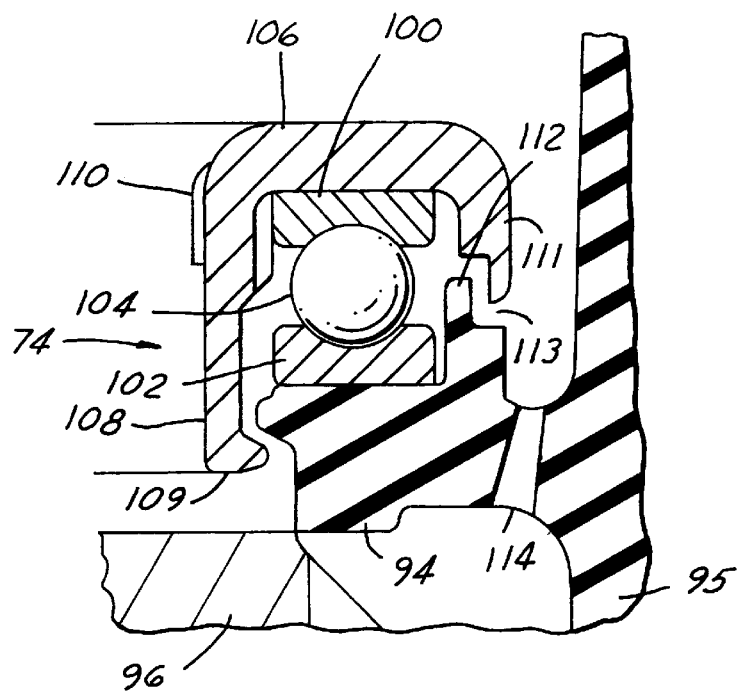
FIG. 4 is an enlarged fragmentary sectional view showing the bearing.

Referring to FIG. 4, the ball bearing unit 74 includes annular upper and lower races 100 and 102 between which are confined a series of balls 104. An annular bearing cap 106 of inverted, generally U-shaped cross section covers the upper race 100. The races 100 and 102 are captured between the bearing base 94 and bearing cap 106. The flange 88 of the outer ring plate 38 of the strut is seated on the base of the bearing cap 106. The vertical radially inner leg 108 of the bearing cap has a radially outwardly turned terminal portion 109 at the lower end underlying the radially inner portion of the bearing base 94. The inner leg 108 of the bearing cap 106 has circumferentially spaced projections 110 engaging the terminal portion 90 of the plate 38 of the strut mount to locate the ball bearing unit 74 relative to the strut mount. The radially outer vertically extending leg 111 of the bearing cap overlaps an outer portion 112 of the bearing base 94 in spaced relation thereto to provide a labyrinth seal 1 13 against the entry of foreign matter into the bearing. Circumferentially spaced drain holes 114 in the bearing base 94 clear any foreign matter that might pass the labyrinth seal 86.

Because the bearing base 94 is formed as an integral part of the spring seat 66, there is one less separate part of the bearing assembly and therefore fewer parts necessary to align and less likelihood of a misalignment of parts and contact between the lip 84 of the ring plate 38 of the strut mount and the trough 82 of the upper spring seat 66. Accordingly the labyrinth seal 86 can be maintained without contact between the trough and the lip so that the seal is effective throughout 360° of overlap, and without rubbing. If rubbing should occur, the plastic material of the upper spring seat 66 is less likely to cause a squeaking noise than the rubber coating used in the past, and the plastic material will soon rub away so that any possible noise will not persist.

What is claimed is:

1. In a spring and strut module for an automotive vehicle including an extensible and contrastable strut adapted to be secured to a rigid frame of the vehicle by a strut mount and a spring unit including a spring for resisting retraction of the strut, the improvement comprising, a bearing and upper spring seat assembly including an annular upper spring seat for the spring and an annular bearing for the spring seat, said bearing including balls confined between upper and lower races, a bearing base formed integrally with said spring seat supporting said lower race, and a bearing cap covering said upper race, said bearing cap providing a seat for said strut mount, wherein said spring seat has an annular ring portion, said bearing base is annular and extends radially inwardly from said ring portion, said ring portion has an annular extension skirt extending downwardly below the level of said bearing base, and an annular series of circumferentially spaced reinforcing ribs between said skirt and said bearing base.

2. In the module having the improvement set forth in claim 1, and further including drain holes in said bearing base.

3. In the module having the improvement set forth in claim 1, wherein said spring seat is made of glass fiber reinforced Nylon.

4. In the module having the improvement set forth in claim 1, wherein said bearing base and bearing cap have overlapping portions to inhibit entry of foreign matter into said bearing.

5. In the module having the improvement set forth in claim 1, wherein said spring seat has an annular upwardly opening trough, and said strut has an annular downturned lip extending into said trough to provide a labyrinth seal inhibiting entry of foreign matter, said trough and lip being out of contact so as not to cause noise.

6. In a module having the improvement set forth in claim 1, wherein said spring seat is made of a plastic material.

7. In a spring and strut module for an automotive vehicle including an extensible and contractable strut adapted to be secured to a rigid frame of the vehicle by a strut mount and a spring unit including a spring for resisting retraction of the strut, the improvement comprising, a bearing and upper spring seat assembly including an annular upper spring seat for the spring and an annular bearing for the spring seat, said spring seat being made of a plastic material, said bearing including balls confined between upper and lower races, a bearing base formed integrally with said spring seat supporting said lower race, and a bearing cap covering said upper race, said races being captured between said bearing base and bearing cap, said bearing cap providing a seat for said strut mount, and drain holes in said bearing base, wherein said spring seat comprises an annular ring portion, said bearing base is annular and extends radially inwardly from said ring portion, said ring portion has an annular extension skirt extending downwardly below the level of said bearing base, and an annular series of circumferentially spaced reinforcing ribs between said skirt and said bearing base, said bearing base and bearing cap having overlapping portions to provide a labyrinth seal to inhibit entry of foreign matter into said bearing, said spring seat having an annular upwardly opening trough, said strut has an annular downturned lip extending into said trough to provide a second labyrinth seal to inhibit entry of foreign matter, and said trough and lip being out of contact so as not to cause noise.

8. In a module having the improvement set forth in claim 7, wherein said spring seat is made of glass fiber reinforced Nylon.

* * * * *

UNITED STATES PATENT AND TRADEMARK OFFICE
CERTIFICATE OF CORRECTION

PATENT NO : 6,126,155
DATED : October 3, 2000
INVENTOR(S) : Smith et al.

It is certified that error appears in the above-identified patent and that said Letters Patent are hereby corrected as shown below:

In the Title [54] section, please change "BREAKING" to --BEARING--.

Signed and Sealed this

First Day of May, 2001

NICHOLAS P. GODICI

*Attest:*

*Attesting Officer*     *Acting Director of the United States Patent and Trademark Office*